United States Patent

[11] 3,628,648

| [72] | Inventor | Stanley A. McClusky<br>3001 Baylor Ave., Bakersfield, Calif. 93305 |
|---|---|---|
| [21] | Appl. No. | 862,260 |
| [22] | Filed | Sept. 30, 1969 |
| [45] | Patented | Dec. 21, 1971 |

[54] COMPACT ORIENTING AND SINGULATING SYSTEM FOR IRREGULAR ELONGATED OBJECTS SUCH AS POTATOES
15 Claims, 6 Drawing Figs.

| [52] | U.S. Cl. | 198/30, 198/33 AA |
|---|---|---|
| [51] | Int. Cl. | B65g 47/26 |
| [50] | Field of Search | 198/30, 33 AA; 193/43 |

[56] References Cited
UNITED STATES PATENTS

| 2,911,082 | 11/1959 | Wenzel, Jr. et al. | 193/43 |
| 2,937,738 | 5/1960 | Albertoli et al. | 198/33 AA |
| 3,113,574 | 12/1963 | Greedy et al. | 198/33 AA |
| 3,255,864 | 6/1966 | Oldershaw et al. | 198/33 AA |

*Primary Examiner*—Richard E. Aegerter
*Assistant Examiner*—Hadd S. Lane
*Attorney*—Miketta, Glenny, Poms & Smith ABSTRACT: A machine and method in which irregular elongated objects, such as potatoes and other produce, are conveyed in limited numbers by a dribble elevator from a bin into a concave trough inclined downwardly towards an outlet and vibrating longitudinally to move the potatoes therealong while the potatoes are being oriented by the concavity of the trough into positions, one behind the other, with their major axes disposed longitudinally of the trough until each potato, singly, slides out of the outlet to be engaged by a faster moving V cross section belt and pulled from the outlet thereby, to advance thereon in spaced oriented tandem relationship for sizing.

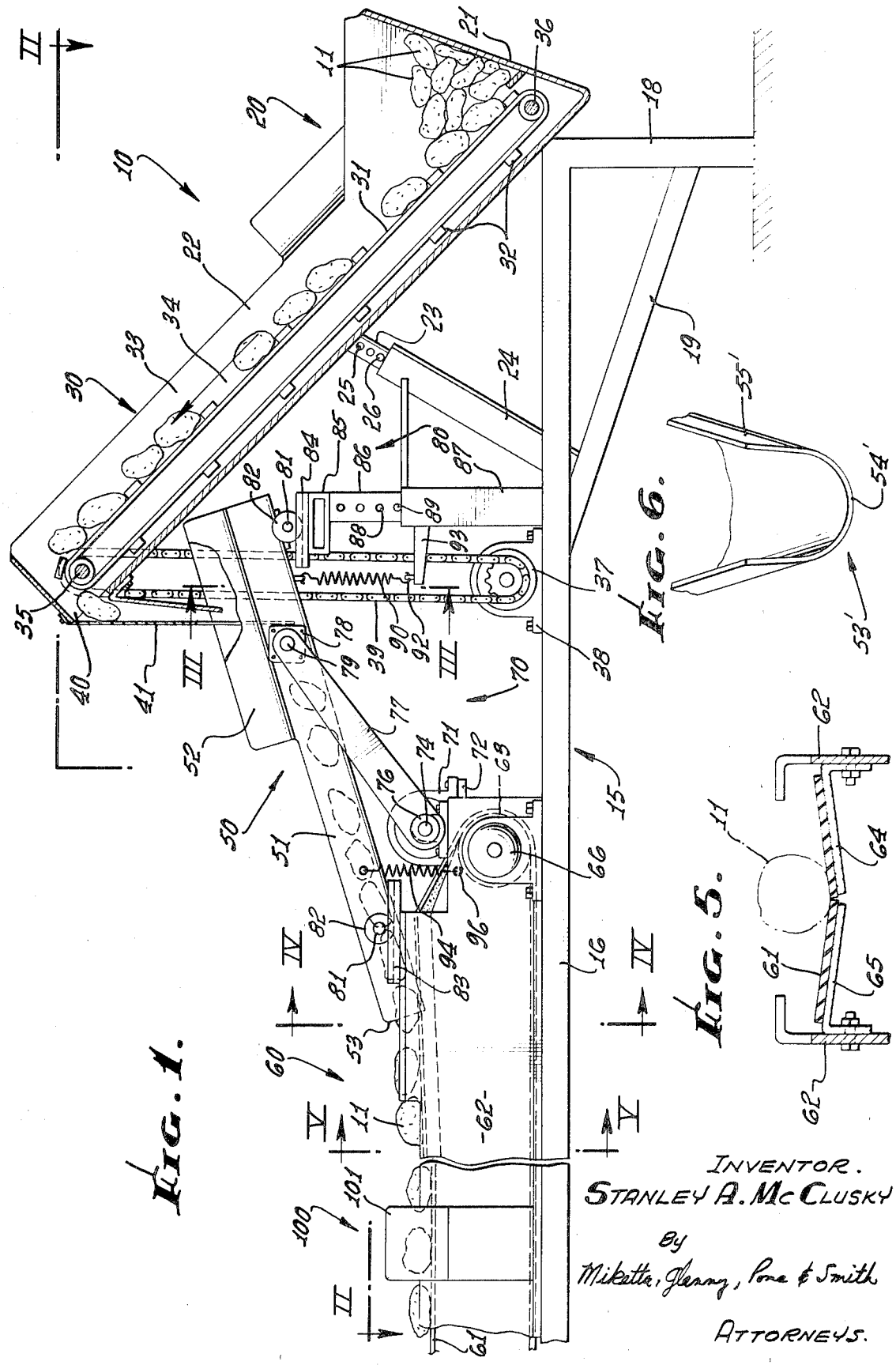

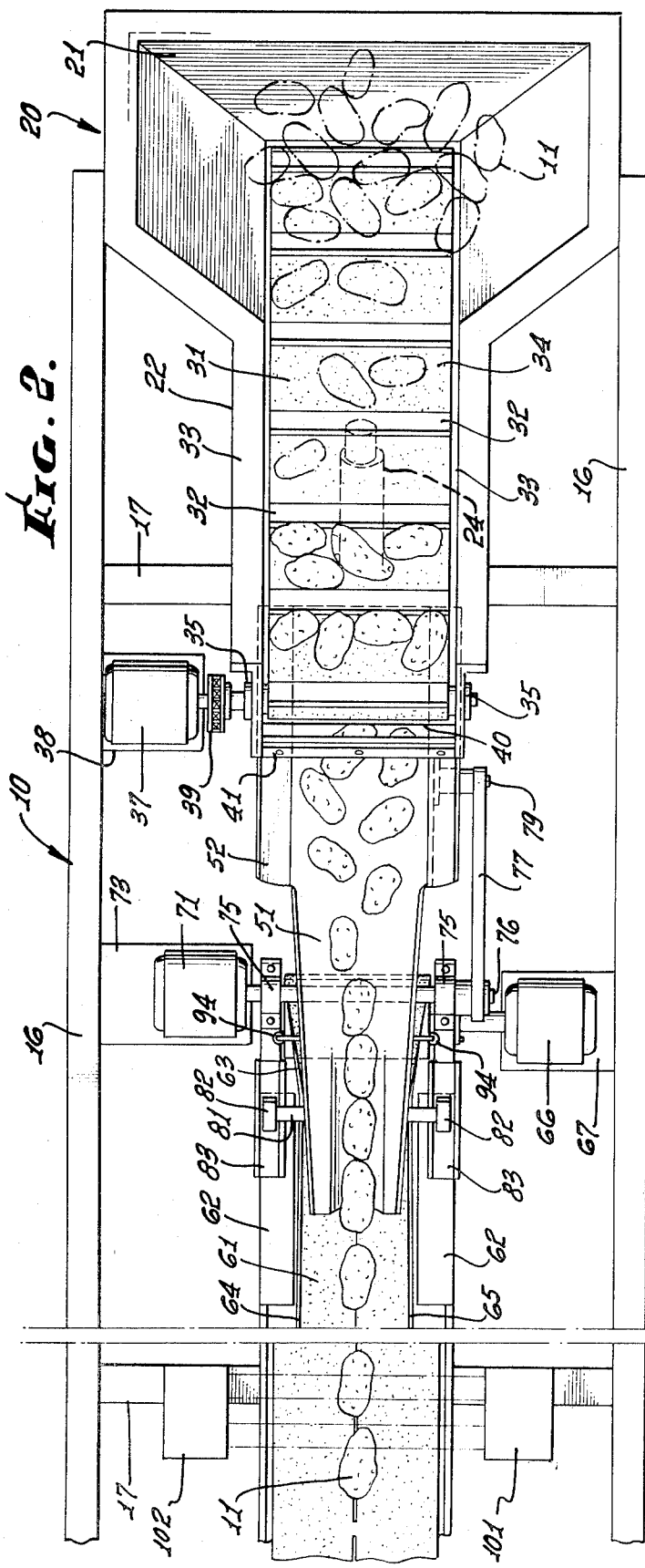
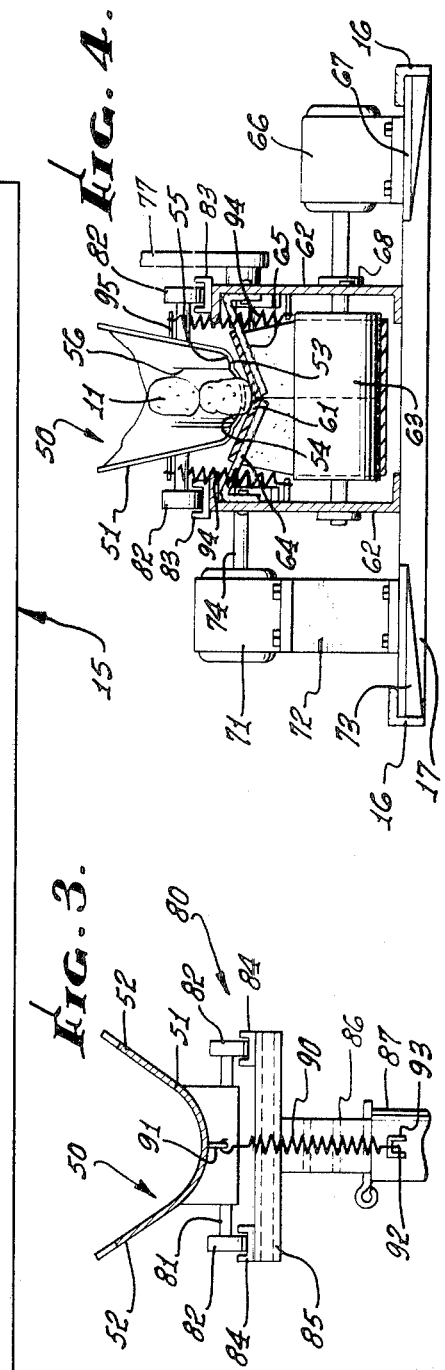

3,628,648

COMPACT ORIENTING AND SINGULATING SYSTEM FOR IRREGULAR ELONGATED OBJECTS SUCH AS POTATOES

BACKGROUND OF THE INVENTION

For many operations in the field of article and produce handling it is desirable to rapidly automatically convert randomly haphazardly positioned articles into uniformly oriented and spaced articles for further operations. This is true in automatic sizing and particularly true in the automatic sizing of irregular elongated objects such as potatoes, corn, other produce and fruits, using various devices responsive to length, width, and volume of articles being processed, such as arrangements of photoelectric cells.

One such prior method of sizing elongated irregular objects such as potatoes is to pass the potatoes on a conveyor belt through a series of light beams directed at photoelectric cells. As the beams are successively broken by the potato, the respective cells indicate the space occupied by the potato, and by preselected location of the cells and beams and by the beams intercepted by a potato, an estimate of the size of the potato or other elongated irregular object passing therethrough can be obtained.

As the beams usually relate only to a planar area, the objects to be sized must all have the same orientation with respect to the beams so that the planar area is representative of the size of each object. Also to prevent false readings, the objects must be spaced apart with longitudinal axes aligned and in single file, otherwise the beams may be broken by two or more potatoes simultaneously giving the same reading as if one potato had broken the beam. Therefore, in order to successfully size objects by this or related methods, the elongated irregular objects such as potatoes must be oriented along their major axis or greatest length and they must be spaced longitudinally from each other.

Other prior-proposed apparatuses for arranging potatoes in single file for sizing purposes have included a rotatable conical article-dispersing surface surrounded by a peripheral wall, the potatoes being fed in quantity to the rotatable conical surface whereby the potatoes begin to separate and move in a circular path along the peripheral wall and in a single file. The conical surface and peripheral wall form an acute angle into which a potato may become wedged, damaged, and obstruct or interfere with the desired steady flow of succeeding potatoes. In other prior-proposed apparatuses, potatoes have been advanced across a plurality of transverse rolls or transversely arranged reciprocating racks or bars until a transverse row of potatoes is formed which may then be deposited upon a conveyor moving in a direction normal to the prior direction of the potatoes. Such prior-proposed apparatuses were relatively complex and expensive to manufacture, were often slow moving, and the rate of feed of operation to associated sizing means was often insufficient to maintain operation of the sizing means at full capacity or efficiency. Therefore, duplication of such equipment was often resorted to in order to maintain an adequate feed of properly oriented and singulated potatoes to the sizing means. For example, a plurality of parallel paths for potatoes were provided to achieve a desired output. In some prior apparatuses where potatoes were divided into a plurality of streams of potatoes and then later merged into a single line for passing a sizing station, a relatively long conveyor length was required in order to accomplish such singulation and ultimate orientation of the potatoes into a desired position for sizing.

SUMMARY OF THE INVENTION

This invention relates to systems for handling elongated irregular objects and more particularly to a machine and method for orienting and singulating such objects such as potatoes.

Generally speaking, the compact orienting and singulating system of this invention includes a supply means for supplying the objects in bulk fashion to a separating and conveying means which separates limited number of elongated irregular objects and moves a limited number of objects to the orienting means where the elongated irregular objects are oriented longitudinally before being moved by pull means therefrom in longitudinal spaced relationship while the orientation of the objects is maintained. The system is also provided with vibrator means for insuring that the elongated irregular objects move along the orienting means and are oriented thereby.

It is the primary object of this invention to provide a novel handling system for elongated irregular objects such as potatoes which will orient the potatoes along the major axis thereof and singulate the potatoes in a single file in selected spaced relationship.

It is a further object of this invention to rapidly accomplish the singulation and orientation of a large quantity of potatoes mechanically in a comparatively short distance.

Other and additional objects of this invention are to provide a system which separates a bulk supply of potatoes into limited numbers or groups, to provide an orienting means with a concave surface with a gradually lessening width for orienting the potatoes along the major axis thereof, to provide a system which vibrates the concave surface to insure proper orientation of potatoes and to prevent the potatoes from jamming in the orienting means, to provide a supporting structure for the orienting means which allows for vibration; to provide a means for pulling the oriented potatoes from the orienting means faster then the potatoes are sliding from the outlet thereof to space the potatoes; to provide a V-shaped cross section conveyor belt engaged by the potatoes as they exit the outlet of the orienting means to maintain the orientation of the potatoes.

Other and additional objects of this invention will become apparent from the following description of the drawings.

In the drawings:

FIG. 1 is a side elevational view partially in cross section of a compact orienting and singulating system embodying this invention, with a sizing station schematically indicated at one end thereof.

FIG. 2 is a top view taken along the plane II—II of FIG. 1 showing the compact orienting and singulating system, and the sizing station at one end thereof.

FIG. 3 is a cross sectional view taken along the transverse vertical plane of III—III of FIG. 1 showing the shape of the trough of the system of FIG. 1.

FIG. 4 is a cross sectional view taken along the transverse vertical plane IV—IV of FIG. 1 showing the configuration of the conveyor belt and the outlet of the trough of the system of FIG. 1.

FIG. 5 is a cross-sectional view taken along the transverse vertical plane V—V of FIG. 1 showing the configuration of the conveyor belt forward of the position shown in FIG. 4.

FIG. 6 is a fragmentary front view of a modified trough outlet configuration taken from the plane indicated by line IV—IV of FIG. 1.

Referring now particularly to FIG. 1, an exemplary compact orienting and singulating system made according to this invention is indicated generally by the number 10. The compact singulating and orienting system 10 is shown with potatoes 11 being oriented and singulated, but it should be understood that the system 10 can be used with any elongated irregular object for orienting that object along its major axis. Some further examples of such elongated irregular objects which may be oriented and singulated by the system 10 are corn, cucumbers, yams, squash, carrots, in generally all types of elongated produce or fruits.

The compact orienting and singulating system 10 generally includes a supply means 20 for receiving the elongated irregular objects such as potatoes 11, a separating and conveying means 30 for separating limited numbers of potatoes 11 and conveying them away from the supply means 20, an orienting means 50 for orienting the potatoes 11, received from the separating and conveying means 30 and a pull means 60 for removing the oriented potatoes 11 from the orienting means 50. The orienting means 50 may additionally include a vibrator means 70 to aid the orienting means 50 in moving and orienting the potatoes 11. The potatoes 11 after being oriented and singulated by the system 10, pass one or more sizing stations 100 where selected sizes are separated and transported by crossbelts (not shown) to boxing stations or to other selected destinations to be sized for sorting, according to size.

The compact singulating and orienting system 10 is constructed on a frame 15 having longitudinally spaced rails 16 interconnected by lateral rails 17. The frame 15 has at either end downwardly extending legs 18 for supporting the frame 15. Braces 19 run from the legs 18 to the closest lateral rail 17 to provide rigidity to the frame 15.

Referring particularly to FIGS. 1 and 2, the supply means is located on the right-hand or rear end of the frame 15. In the preferred embodiment, the supply means 20 is an open-top bin 21 at the lower end of a dribble elevator 22. The dribble elevator 22 has a centrally located support post 23 extending downwardly therefrom. The post 23 is received into the open upper end of a sleeve 24 with the lower end thereof secured to the right-hand or rear braces 19. The post 23 is slidable relative to the sleeve 24 to move the dribble elevator 22 to different elevations while maintaining virtually the same angle. The post 23 has a series of longitudinally spaced lateral holes 25 through one of which a pin 26 is inserted to maintain the dribble elevator 22 at the preselected height.

The separating means 30 according to the preferred embodiment is also part of the dribble elevator 22. The separating means 30 includes an endless belt 31 having transversely spaced blocks or spacers 32 therealong. The blocks or spacers 32 together with the sidewalls 33 of the dribble elevator 22 define pockets 34 for receiving and holding a limited number of potatoes 11. The pockets 34 are normally only sufficiently large to pick up a limited number potatoes, such as two to four at a time, from the supply of potatoes 11 in the open-top bin 21.

The separating means 30 also includes drive sprocket means 35 at the left-hand or upper end of the dribble elevator 22 with an idler roller 36 at the right-hand or lower end. The sprocket means 35 is driven by a variable speed motor means 37 conventionally bolted on a motor bracket 38 mounted on the frame 15. A suitable chain drive 39 drivingly connects the variable speed motor means 37 to drive sprocket means 35, enabling the motor means 37 to rotate the drive sprocket means 35, and move the endless belt 31 and the blocks 32 thereon. The belt 31 moves limited numbers of potatoes 11 from the bin 21, up along the dribble conveyor 22, to the upper of outlet end 40 thereof to fall over the upper end 40 and onto orienting means 50. The upper end 40 of the dribble elevator 22 has a curtain 41 of suitable heavy pliant material such as canvas attached thereto and extending down into the orienting means 50 to control the fall of the potatoes 11 and to prevent potatoes 11 from bunching up in the lower portion of the orienting means 50.

The orienting means 50 includes a trough 51 of concave cross section with the width of concavity decreasing from the right-hand upper end to the left-hand lower end. The trough 51 adjacent the upper end is provided with the side extensions 52 for deflating potatoes 11 coming from the sides of the endless belt 31 toward the center portion of the trough 51.

The lower or left-hand end of the trough 51 has an outlet 53. As best seen in FIG. 4, the outlet 53 of the trough 51 has a central small concave U cross section lower portion 54 bounded at each side by a large concave U cross section upper portion 55 which forms a ridge or step 56 at the junction thereof with the small portion 54. The outlet opening of the small portion 54 is sized to permit a small, oriented single potato 11 to slide therethrough while maintaining orientation thereof, and the outlet opening of the large portion 55 is sized to permit a large single potato 11 to slide therethrough while maintaining the orientation thereof by the sides of the large potato engaging the step 56. The configuration of the outlet 53 permits the outlet to pass singly both large and small potatoes 11 while maintaining the orientation of the potatoes 11 in either case.

A modified outlet 53' is shown in FIG. 6 and is formed with a generally semicircular bottom 54' and upstanding sidewalls 55'.

The potatoes 11 are oriented in the trough 51 while sliding therethrough because the potatoes 11 roll and slide due to gravity along the concave sidewalls until the sidewalls orient the potatoes 11 with the major axes thereof disposed longitudinally of the trough. The potatoes 11 will continue this orientation as they slide the rest of the way along the trough 51 and out of the outlet 53.

The pull means 60 in the preferred embodiment is shown as an endless conveyor belt 61 having one end located below the outlet 53 of the trough 51. As seen in FIG. 4, the conveyor belt 61 runs between spaced sidewalls 62 carried by the lateral rails 17 of frame 15. Between the spaced sidewalls 62 is pivotally mounted a drum 63 around which the conveyor belt 51 passes. Flanged support plates 64 and 65 are bolted at the flanges to the spaced sidewalls 62 to form with each other a V to support and guide the upper lay of the conveyor belt 61 along its path. As seen by comparing FIGS. 4 and 5, the angle of the V varies from an obtuse angle below the outlet 53 of the trough 51 to a flat 180° angle forwardly thereof. The conveyor belt 61 follows this variation in V angle because it has longitudinal central located short slits about 3 inch long spaced with one half inch of material therebetween in the belt 61 along the center thereof enabling the belt 61 to conform to the V configuration of the plates 64 and 65. The endless conveyor belt 61 is driven through the drum 63 by a variable speed motor means 66 bolted to a motor bracket 67 carried on the frame 15.

The motor means 66 has a drive shaft extending through bearings 68 carried by the spaced sidewalls 62 and nonrotatably attached to the drum 63. The motor means 67 is variable in speed to drive the conveyor belt 51 at different rates of speed, for a purpose which will appear later.

The vibrator means 70 includes a variable speed motor means 71 which as seen in FIG. 4 is bolted to a spacer block 72 secured to a mounting bracket 73 secured to one of the longitudinal side rails 16. Extending out of the variable speed motor means 71 is a cross-shaft 74 which extends through suitable support bearings 75. The end of the cross-shaft 74 opposite from the variable speed motor means 71 is provided with an eccentric connection at 76 to the lower end of a driving bar 77. As seen in FIG. 1, a bracket 78 is attached to one side of trough 51 and supports a stub shaft 79 extending outwardly therefrom for pivotal connection to the upper end of the driving bar 77.

The trough 41 is longitudinally movable mounted by means 80 including axles 81 at opposite ends of the trough carrying on their ends outboard rotatable wheels 82. The front set of wheels 82 (as seen in FIG. 4) are received in a spaced pair of front channel-shaped tracks 83 secured to the spaced sidewalls 62. The rear set of wheels 82 are similarly received in a spaced pair of rear channel-shaped tracks 84 secured to a transverse support member 85. The transverse support member 85 has a centrally located downwardly extending post 86 which is received in an open upper end of a cylinder 87. The lower end of cylinder 87 is attached centrally of a lateral rail 17 of the frame 15. The post 86 has a series of openings 88 spaced longitudinally thereof for receiving a pin 89 which engages the upper end of cylinder 87 to provide an adjustable support of variable height for the upper end of trough 51.

The mounting means 80 also includes a single rear vertical spring 90 with its top end connected to and eyebolt 91 attached to the underside of the trough 51 and its lower end thereof connected to an eyebolt 92 attached to a bracket 93 extending forwardly from cylinder 87. A pair of front springs 94 each has its top ends thereof extending through an eyelet 95 mounted on each side of the trough 51 adjacent the lower end thereof. The bottom end of each spring 94 extends through a hole 96 in sidewall 62. The springs 80 and 84 bias trough 51 downwardly, insuring that the wheels 82 continue to engage the front and rear tracks 83 and 84 during vibrational movement of the trough 51 by the vibrator means 70.

An exemplary sizing station 100 as seen in FIGS. 1 and 2 may include a source 101 of light beams and a photocell means 102 mounted across from each other on one of the lateral rails 17. The source 101 of light beams and the photocell means 102 are so positioned that the passing of oriented spaced potatoes 11 along the conveyor belt 61 interrupts temporarily at least some of the light beams to indicate the length and height of a potato 11 passing therebetween. The photocell means 102 converts the interruption of the light beams to an electrical signal which is used to actuate an airblast or gate means (not shown) to move a potato 11 off belt 61 and onto a crossbelt for carrying sized potatoes to a boxing station or other suitable storing or handling means.

In operation, elongated irregular objects shown as potatoes 11 are placed in the open-top bin 21 of the dribble elevator 22. The transverse blocks or spacers 32 of the endless belt 31 separate and remove limited numbers of the potatoes 11 from the bin 21 and move them up the dribble elevator 22 to the upper or outlet end 40 where the potatoes 11 fall into the trough 51 in diverse orientations of their major axes. The curtain confines and controls the fall of the potatoes 11. In the trough 51, the potatoes 11 slide beneath the curtain from the upper end, down the trough 51 toward the outlet 53. As the potatoes are sliding along the trough 51, they may roll laterally due to the concavity, and are turned lengthwise of the trough which slowly narrows toward the outlet 53. As shown in FIG. 2, the rolling of the potatoes 11 and the narrowing of the width of the trough 51 ultimately aligns potatoes 11 longitudinally of the trough 51.

To assist and to rapidly accomplish such lengthwise orientation of the potatoes in the relatively short length of the trough, the trough is subjected to vibrational impulses by vibrator means 70. The variable speed motor means 71 rotates crossshaft 74 with the eccentric connections 76 to impart a rapidly reciprocating motion to the drive bar 77, which motion in turn is imparted to trough 51 through shaft 79 and bracket 78. The trough 51 reciprocates horizontally on the wheels 82 rolling along the front and rear tracks 83 and 84 to provide a horizontal motion component to the trough 51. The horizontal motion of the trough 51 is also directed longitudinally of the trough and insures that the potatoes 11 therein do not jam against and interlock each other but continue to move downwardly along the trough 51 toward the outlet 53. By the time each potato 11 reaches the outlet 53 as shown in FIG. 2, a potato 11 is oriented with its major axis extending longitudinally along the trough 51.

As each potato 11 projects beyond the edge of outlet 53 (either the small portion 54 or large portion 55), the leading portion of the potato is engaged by generally opposed surfaces of the V-shaped portion of conveyor belt 61 which at outlet 53 is closely adjacent to the edge of the outlet. The initial engagement of opposite side surfaces of the leading portion of the potato by the conveyor belt 61 which is moving at a rate of speed faster than the speed of discharge of a potato from the outlet 53 causes the potato to be pulled from the outlet 53 while maintaining the longitudinal orientation of a potato. Since the belt 61 is moving faster than a potato moving through the outlet 53 before contact with the belt 61, each potato discharged from outlet 53 will be longitudinally spaced from the succeeding potato. Thus immediately after potatoes 11 leave discharge outlet 53, a single line of potatoes is provided in which the longitudinal or major axes of the potatoes are virtually aligned with respect to the longitudinal axis of belt 61 and are spaced apart in tandem relation a selected distance depending upon the relative speeds of the conveyor belt 61 and potatoes moving through outlet 53. In order to increase output of the orienting and singulating system described, it is desirable that the spacing between potatoes be minimized so that the rate of flow of potatoes passing a sizing station may be a maximum.

Before the leading potato reaches a sizing station 100, the longitudinal half portions of the conveyor belt are guided into flat planar relation so that virtually the entire potato profile will pass through and intercept light beams from the light beam source 101.

In operation of the system described above, the speeds at which the dribble elevator 30 and the conveyor belt 61 are operated are correlated so that the number of potatoes fed to the trough means 50 and the potatoes discharged therefrom will provide a continuous uniform singulated flow of oriented potatoes to the sizing station. Vibrator means 70 may also be regulated in accordance with the speeds of the elevator 30 and conveyor 61 so that the rapidity with which the potatoes are oriented in the trough any be correlated to provide such continuous uniformly spaced potato flow.

To accommodate potatoes of different type or produce of different kinds which may vary in density and size, it should by noted that the elevator means 30 may be adjusted with respect to the upper end of the trough means 50 so that a selected relationship between the discharge upper end of elevator 30 and the upper end of the trough may provide optimum produce-handling conditions. The upper end of the trough means may be adjusted as previously described so that the height of fall of the produce from the upper end of the elevator 30 to the trough may be increased or decreased depending upon the produce being processed.

It is important to note also that the vibrational impulses given to the trough means through the drive bar 77 include a relatively small vertical force component which is effectively dampened and minimized by springs 90 and 94 so that the vibrational component imparted to potatoes or produce in the trough is essentially a horizontal and longitudinal vibrational component which effects rapid alignment of the produce or articles in the trough longitudinally thereof.

While the orienting and singulating apparatus has been described above with respect to elongated articles such as potatoes, it will be apparent to those skilled in the art that the apparatus may be used with different types or kinds of produce for singulating purposes only. For example, it is often desired to count produce such as cantaloupes. Forming a single file of cantaloupe is readily rapidly accomplished by apparatus of this invention. A counting station provided with well-known counting means may be positioned adjacent the line of cantaloupe (in place of a sizing station) and each counted as it passes the counting station.

It will thus be readily apparent that in the practice of this invention a bulk source of potatoes is provided from which a limited number of potatoes are successively separated. The limited number of potatoes are then singulated and oriented in a relatively short space and discharged in oriented position in selected spaced relation for transport to a suitable sizing station. Since the potatoes are oriented lengthwise, the present apparatus may be used to present potatoes, such as seed potatoes, to a cutting machine. It will thus be understood that the apparatus may be used for either or both orienting and singulating purposes.

It will be understood that various modifications and changes may be made in the method and apparatus which embodies the spirit of this invention.

I claim:

1. A compact singulating and orienting system for elongated irregular objects comprising in combination:

supply means providing a supply of elongated irregular objects to the singulated and oriented;

means to separate the objects from the supply means and convey limited numbers of objects away from the supply means;

orienting means including a trough of concave cross section having one end thereof adjacent to said separating and conveying means for receiving objects therefrom;

means connected with said orienting means for imparting motion to said objects to move and to orient said objects along said trough, each of said objects with its major axis longitudinally disposed with respect to the trough;

said trough decreasing in width in a direction away from one end and having an outlet at the other end for passing one at a time, longitudinally disposed elongated objects; and pull means at the outlet of the trough for engagement with each object discharged from said outlet and for advancing each object in an oriented position.

2. The system as in claim 1 wherein in the outlet of the trough has a stepped concave configuration to allow large elongated objects to pass therethrough while still maintaining orientation of smaller elongated objects.

3. The system as in claim 1 wherein the means imparting motion to the elongated objects includes downward inclination of the trough.

4. The system as in claim 3 wherein the means imparting motion to the elongated objects additionally comprises vibrator means imparting longitudinal vibrational components to the trough to aid in orienting the elongated objects.

5. The system as in claim 4 wherein the trough has rollers, and the system includes a frame with tracks for receiving the rollers, said rollers being guided on the tracks during the vibrations of the trough.

6. The system as in claim 1 wherein the pull means is a conveyor belt moving past the outlet of the trough at a rate of speed faster than the speed of the objects passing from the outlet, whereupon as the elongated objects move out of the outlet of the trough, the objects engage the belt to be pulled onto the belt from the outlet into spaced relationship with each other thereon.

7. The system as in claim 6 wherein the belt is provided with a V-cross-sectional shape at and forwardly of the outlet of the trough and the belt engages the elongated object at two points for pulling the object from the outlet and for maintaining the orientation of the elongated object.

8. The system as in claim 3 wherein means are provided to selectively change the inclination of the trough to selectively change the speed at which the elongated objects move along the trough and out through the outlet thereof.

9. The system as in claim 6 additionally including control means for varying the speed of the conveyor belt past the outlet of the trough to accommodate different speeds of objects moving along the trough and out the outlet thereof, and to vary the spaced relationship between the objects on the belt.

10. In an orienting and singulating system for elongated irregular objects, the improvement comprising the provision of:

a trough of concave cross section with decreasing width from one end to an outlet at the other end thereof, the one end being configured to receive a plurality of elongated irregular objects, and the outlet being configured to pass one oriented elongated object at a time therethrough, said outlet of the trough having a stepped concave configuration with the steps thereof narrower than the width of the trough to maintain the orientation of the small elongated objects by engagement with the steps of the outlet, while permitting larger elongated objects to pass over the steps of the outlet while sliding therealong to maintain orientation of the larger elongated objects.

11. A compact singulating and orienting system for elongated irregular objects comprising in combination:

orienting means for receiving a plurality of objects to be oriented and including a trough of concave cross section having one end to receive more than one object at a time;

means connected with said orienting means for imparting motion to said objects to move and to orient said objects along said trough, each object with its major axis disposed longitudinally of the trough;

said trough decreasing in width in a direction away from said one end and having an outlet at the other end for passing longitudinally disposed elongated objects one at a time; and pull means at the outlet of the trough engaging frontward and sideward surfaces of each object discharged from said outlet to maintain orientation of said object while pulling the object from said trough and for advancing each object in an oriented position.

12. In a system as stated in claim 11 wherein said pull means includes a belt means having a V section as it passes said outlet.

13. In a system as stated in claim 11 wherein said pull means includes spaced belt portions for engagement with said frontward sideward surfaces of each object and an intermediate belt portion to later engage bottom surfaces of each oriented object.

14. In a system as stated in claim 11 wherein said means for imparting motion to said objects includes means for imparting substantially horizontal vibratory force components to said objects.

15. In a system as stated in claim 14 wherein said means for imparting substantially horizontal vibratory components to each object includes vertically spaced horizontal tracks, and rollers on said trough guided on said tracks.

* * * * *

UNITED STATES PATENT OFFICE
CERTIFICATE OF CORRECTION

Patent No. 3,628,648      Dated December 21, 1971

Inventor  Stanley A. McClusky

It is certified that error appears in the above-identified patent and that said Letters Patent is hereby corrected as shown below:

Column 1, line 54, delete [operation] and insert --potatoe--.

Column 3, line 50, delete [of] and insert --or--

Column 5, line 25, after "curtain" insert --41--

Column 6, line 14, delete [any] and insert --may--

Signed and sealed this 5th day of December 1972.

(SEAL)
Attest:

EDWARD M. FLETCHER, JR.
Attesting Officer

ROBERT GOTTSCHALK
Commissioner of Patents